(12) United States Patent
Lohoefener et al.

(10) Patent No.: US 9,715,007 B2
(45) Date of Patent: Jul. 25, 2017

(54) X-BAND SURFACE MOUNT MICROSTRIP-FED PATCH ANTENNA

(71) Applicant: Garmin International, Inc., Olathe, KS (US)

(72) Inventors: Adam G. Lohoefener, Olathe, KS (US); David R. Metzger, Overland Park, KS (US)

(73) Assignee: Garmin International, Inc., Olathe, KS (US)

(*) Notice: Subject to any disclaimer, the term of this patent is extended or adjusted under 35 U.S.C. 154(b) by 178 days.

(21) Appl. No.: 14/625,339

(22) Filed: Feb. 18, 2015

(65) Prior Publication Data

US 2015/0234035 A1 Aug. 20, 2015

Related U.S. Application Data

(60) Provisional application No. 61/941,701, filed on Feb. 19, 2014.

(51) Int. Cl.

| | |
|---|---|
| *H01Q 9/04* | (2006.01) |
| *H01Q 1/24* | (2006.01) |
| *G01S 7/03* | (2006.01) |
| *H01Q 21/06* | (2006.01) |
| *H01Q 23/00* | (2006.01) |
| *G01S 13/95* | (2006.01) |

(52) U.S. Cl.
CPC .............. *G01S 7/03* (2013.01); *G01S 13/953* (2013.01); *H01Q 9/0435* (2013.01); *H01Q 21/065* (2013.01); *H01Q 23/00* (2013.01)

(58) Field of Classification Search
CPC ..... H01Q 21/065; H01Q 23/00; H01Q 9/0435
See application file for complete search history.

(56) References Cited

U.S. PATENT DOCUMENTS

| | | | |
|---|---|---|---|
| 5,382,959 A * | 1/1995 | Pett ...................... | H01Q 21/065 343/700 MS |
| 2004/0070536 A1 | 4/2004 | Stoler et al. ................. | 343/700 |
| 2006/0033664 A1 | 2/2006 | Soler Castany et al. ..... | 343/700 |
| 2009/0117855 A1* | 5/2009 | Rofougaran ........... | H01Q 9/065 455/73 |

(Continued)

*Primary Examiner* — Dieu H Duong
*Assistant Examiner* — Michael Bouizza
(74) *Attorney, Agent, or Firm* — Samuel M. Korte; Max M. Ali (57) ABSTRACT

An antenna array for use with an X-band weather radar system comprises a printed circuit board, a plurality of antenna elements, and a plurality of integrated circuit packages. The printed circuit board includes a first side and an opposing second side. The antenna elements are configured to transmit and receive radio waves at frequencies in the X-band. The antenna elements are electrically connected to the first side of the printed circuit board and positioned thereon in a two-dimensional array. A center of each antenna element is located on a point of a grid with grid points orthogonally spaced apart. Each integrated circuit package includes a transmitter electronic circuit and a receiver electronic circuit that are each in electronic communication with one antenna element. Each integrated circuit package is positioned on the first side of the printed circuit board to underlie one antenna element.

17 Claims, 6 Drawing Sheets

(56) References Cited

U.S. PATENT DOCUMENTS

2010/0066631 A1\* 3/2010 Puzella ................ H01Q 21/065
  343/853
2011/0001678 A1\* 1/2011 Hsu ...................... H01Q 21/065
  343/848
2011/0285606 A1 11/2011 De Graauw et al. ......... 343/904

\* cited by examiner

X-BAND SURFACE MOUNT MICROSTRIP-FED PATCH ANTENNA

RELATED APPLICATION

The current non-provisional patent application claims priority benefit, with regard to all common subject matter, of an earlier-filed U.S. provisional patent application titled "X-BAND SURFACE MOUNT MICROSTRIP-FED PATCH ANTENNA", Application Ser. No. 61/941,701, filed Feb. 19, 2014. The identified, earlier-filed application is hereby incorporated by reference into the current application in its entirety.

BACKGROUND

Phased array, or beamforming, radar systems often utilize arrays of antenna elements arranged in a two-dimensional pattern. Each antenna element may be in electronic communication with a transmitter electronic circuit and a receiver electronic circuit. The transmitter electronic circuit may generate a transmit electronic signal that is converted to a radio wave transmitted by the antenna element. The receiver electronic circuit may receive a receive electronic signal that was converted from a radio wave received by the antenna element. The antenna elements are typically positioned in an array of m elements by n elements, wherein m and n may have different values or the same value.

SUMMARY

Embodiments of the present technology provide an antenna array for use with a radar system such as an X-band weather radar system. An embodiment of the antenna array broadly comprises a printed circuit board, a plurality of antenna elements mounted on the printed circuit board, and a plurality of integrated circuit packages in communication with the antenna elements. The printed circuit board includes a first side and an opposing second side. The antenna elements are configured to transmit and receive radio waves at frequencies in the X-band. The antenna elements are connected to the first side of the printed circuit board and positioned thereon in a two-dimensional array. A center of each antenna element is located on a point of a grid with grid points orthogonally spaced apart. Each integrated circuit package includes a transmitter electronic circuit and a receiver electronic circuit that are each in electronic communication with one antenna element. Each integrated circuit package is positioned on the first side of the printed circuit board to underlie one antenna element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to transceiver assemblies and antenna arrays for use with avionic weather radar systems, although the technology discussed herein may also be used with general purpose radar systems and wireless communication devices. Terrestrial weather radar systems may utilize one or more antenna elements mounted on a board or frame that is mechanically rotated 360 degrees to gather meteorological data for a particular vicinity or region. However, in an aircraft, it is typically not necessary to scan the entire sky for meteorological activity since the weather behind the aircraft is generally of less concern. The weather in the direction of travel of the aircraft is of concern. As a result, aviation weather radar systems typically utilize phased array, or beamforming, radar systems that include a stationary array of antenna elements which may be mounted in the nose of the aircraft to allow scanning of the sky in front of the aircraft.

The antenna array may be implemented as a two-dimensional planar array of m antenna elements×n antenna elements, wherein m and n may be integer numbers with the same value, to create a square array, or different values, to create a rectangular array. Each antenna element may receive a transmit electronic signal from a transmitter electronic circuit. The antenna element may convert the electronic signal into transmitted radio waves. Similarly, each antenna element may receive radio waves which are generally the transmitted radio waves reflected from meteorological objects in the sky such as cloud formations, rain drops, snow flakes, and the like. The antenna element converts the radio waves into a receive electronic signal, generally similar to the transmit electronic signal in frequency or wavelength but delayed in time. Using phased-array beamforming techniques, such as those disclosed in U.S. application Ser. No. 13/478,944, filed May 23, 2012, entitled "ELECTRONICALLY STEERED WEATHER RADAR," the entirety of which is incorporated herein by specific reference, the transmit and receive electronic signals from each antenna element may be signal processed to make the radio waves from the entire antenna array function as a single radar beam, whose azimuth and elevation angles can be selectively controlled.

Often, the antenna elements are mounted on one or more printed circuit boards or backplanes in the two dimensional array pattern while the transmitter and receiver electronic circuits for each antenna element may be mounted on one or more printed circuit boards or backplanes, separate from those for the antenna array. Typically, one or more cables or ribbons provide the electronic communication from the electronic circuitry printed circuit boards to the antenna array printed circuit boards. Cabling from one board to another not only creates a long route in the electronic signal chain but also requires a number of connectors and creates a number of interfaces. Long signal routes and numerous connectors and interfaces are all undesirable in high frequency signal processing because they create parasitic losses and reflections which diminish the system link budget and require greater signal power or lower noise figure to overcome. Similar conventional designs place transmitter and receiver circuitry on one side of a printed circuit board with the corresponding antennas being printed on the other side of the board. These conventional designs often suffer from signal loss and difficulty in heat sinking components.

Figure 1:
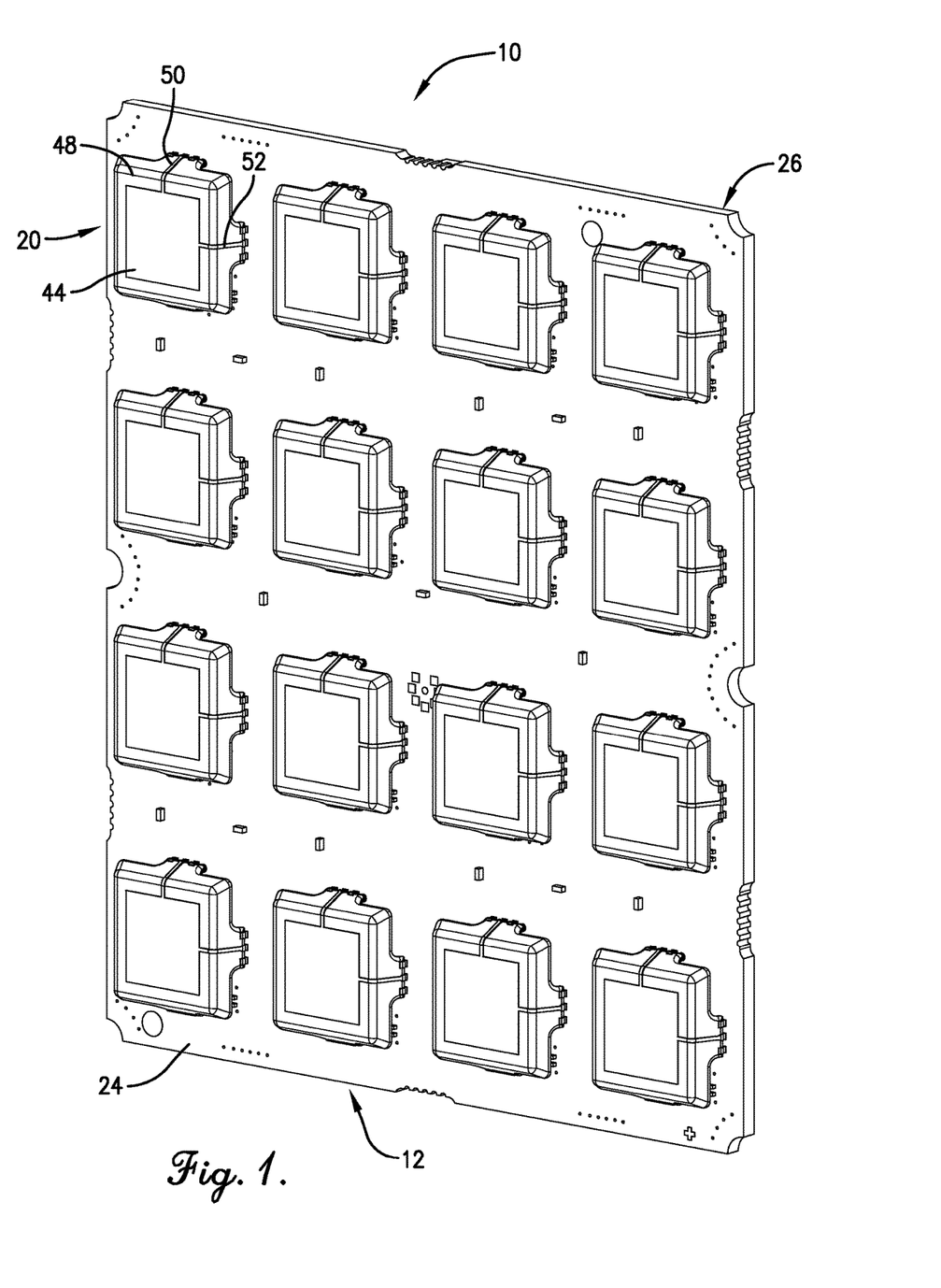
FIG. 1 is a perspective view of an antenna array, constructed in accordance with various embodiments of the present technology, including a plurality of antenna elements attached to a printed circuit board.

Embodiments of the technology will now be described in more detail with reference to the drawing figures. Referring initially to FIG. 1, an antenna array 10 is shown which may be used with an avionic weather radar system for detecting meteorological activity in front of an aircraft. The avionic weather radar system may utilize phased-array beamforming techniques to transmit and receive an adjustable direction radar beam from the antenna array 10. Typically, the avionic weather radar system operates at frequencies in the X-band frequency range, or more specifically in the range from approximately 9.3 gigahertz (GHz) to approximately 9.5 GHz. The antenna array 10 overcomes the problems mentioned above because each element of the antenna array 10 not only is connected to the same printed circuit board as its associated electronic circuitry but also directly overlies the electronic circuitry. The antenna array 10 broadly comprises a printed circuit board 12, a plurality of transmitter electronic circuits 14, a plurality of receiver electronic circuits 16, a plurality of integrated circuit packages 18, and a plurality of antenna elements 20. The printed circuit board 12, one transmitter electronic circuit 14, one receiver electronic circuit 16, one integrated circuit package 18, and one antenna element 20 may also form a transceiver assembly 22.

The printed circuit board 12, shown in FIGS. 1-3 and 7-9, generally provides electrical connection between the integrated circuit packages 18 and the antenna elements 20. The printed circuit board 12 may be of generally known construction with a first side 24 and an opposing second side 26. The printed circuit board 12 may also include multiple conductive layers with a top conductive layer placed on the first side 24, a bottom conductive layer placed on the second side 26, one or more inner conductive layers positioned between the first and second sides 24, 26, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. Each conductive layer may include one or more conductive electronic signal or electrical power or ground traces, one or more signal, power, or ground pads, full or partial power planes, or full or partial ground planes. The conductive layers may be formed from metals typically including copper, but also including nickel, aluminum, gold, silver, palladium, zinc, tin, lead, and the like. In addition, the printed circuit board 12 may include plated through hole vias, blind vias, buried vias, and the like. Furthermore, the printed circuit board 12 may include a plurality of package outlines, each of which comprises a plurality of pads that correspond to pads of the components, such as the integrated circuit packages 18 and the antenna elements 20, to be attached to the printed circuit board 12.

Figure 6:
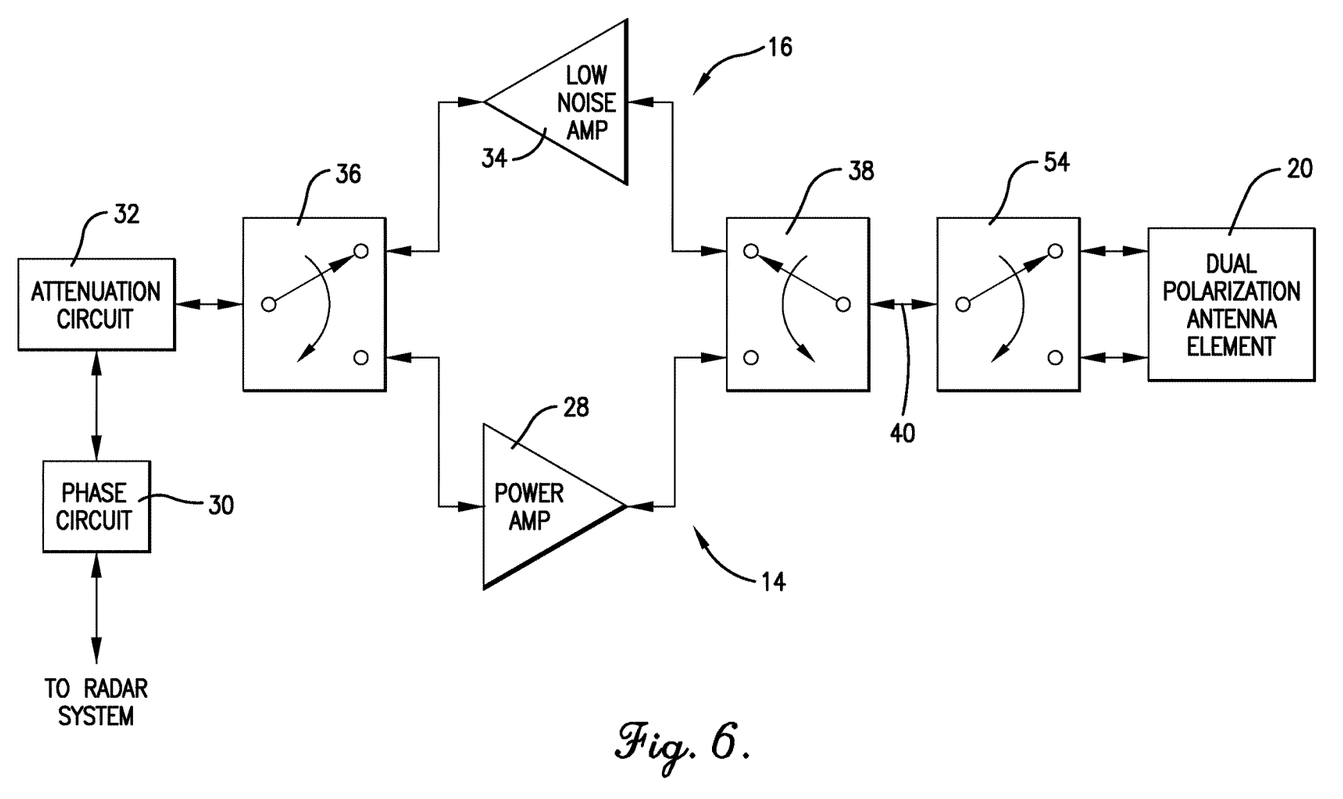
FIG. 6 is a schematic block diagram of electronic circuit components of the antenna array including a transmitter circuit and a receiver circuit.

Each transmitter electronic circuit 14 generally provides a transmit electronic signal to one antenna element 20 to be converted into a radio wave. An exemplary embodiment of the transmitter electronic circuit 14, as shown in FIG. 6, may include at least a power amplifier 28. The transmitter electronic circuit 14 may also include a phase circuit 30 and an attenuation circuit 32. The power amplifier 28 generally performs the final amplification of the transmit electronic signal before it is communicated to the antenna element 20 and converted to a radio wave. The power amplifier 28 may comprise electronic signal amplifier circuits including active and passive devices, operational amplifiers, single stage or multi stage circuits, or the like, or combinations thereof. In various embodiments, the power amplifier 28 may have a fixed gain, although variable gain amplifiers may be used.

The phase circuit 30 may selectively set the phase of the transmit and/or receive electronic signal. The phase circuit 30 may include electronic circuitry such as passive and active devices, data registers, shift registers, delay elements, delay lines, digital signal processors (DSPs), or the like, or combinations thereof. An exemplary embodiment of the phase circuit 30 may include a programmable register which can store a value that sets the phase of the transmit and/or receive electronic signal. In various embodiments, the programmable register has 6 bits of storage.

The attenuation circuit 32 may selectively attenuate or amplify the transmit and/or receive electronic signal. The attenuation circuit 32 may include electronic circuitry such as passive and active devices, operational amplifiers, single stage or multi stage circuits, or the like, or combinations thereof. An exemplary embodiment of the attenuation circuit 32 may include a programmable register which can store a value that sets the attenuation of the transmit and/or receive electronic signal. In various embodiments, the programmable register has 6 bits of storage.

Each receiver electronic circuit 16 generally receives a receive electronic signal from one antenna element 20 that was converted from a radio wave. The receive electronic signal may be similar to the transmit electronic signal in frequency or wavelength, but may be delayed in time and diminished in amplitude. An exemplary embodiment of the receiver electronic circuit 16, as shown in FIG. 6, may include at least a low noise amplifier 34. The receiver electronic circuit 16 may also include the phase circuit 30 and the attenuation circuit 32 discussed above.

The low noise amplifier 34 generally amplifies the small amplitude receive electronic signal without introducing excessive noise to the signal. The low noise amplifier 34 may include electronic circuitry such as passive and active devices, transimpedance amplifiers, filters, operational amplifiers, single stage or multi stage circuits, or the like, or combinations thereof.

When used in the receive signal chain, the phase circuit 30 may selectively set the phase of the receive electronic signal and the attenuation circuit 32 may selectively attenuate or amplify the receive electronic signal.

At least a first switch 36 and a second switch 38 may be utilized with the combination of one transmitter electronic circuit 14 and one receiver electronic circuit 16 in order for the two circuits 14, 16 to utilize the same components. As can be seen from FIG. 6, the phase circuit 30 and the attenuation circuit 32 may be electrically connected to one another to form a single signal path. The first switch 36 may include a fixed contact that is connected to the attenuation circuit 32 and two switchable contacts that are connected to the low noise amplifier 34 and the power amplifier 28, respectively. In a first setting, the first switch 36 may connect the low noise amplifier 34 to the attenuation circuit 32. In a second setting, the first switch 36 may connect the power amplifier 28 to the attenuation circuit 32.

The second switch 38 may include a fixed contact which establishes a transmit-receive signal path 40 and two switchable contacts that are connected to the low noise amplifier 34 and the power amplifier 28, respectively. In a first setting, the second switch 38 may connect the low noise amplifier 34 to the transmit-receive signal path 40. In a second setting, the second switch 38 may connect the power amplifier 28 to the transmit-receive signal path 40.

The power amplifier 28, the phase circuit 30, the attenuation circuit 32, the low noise amplifier, the first switch 36, and the second switch 38 may each have configuration parameters that need to be set. Typically, the radar system has a controller which sets the phase, the attenuation, the configurations of the switches 36, 38, and other parameters.

Figure 2:
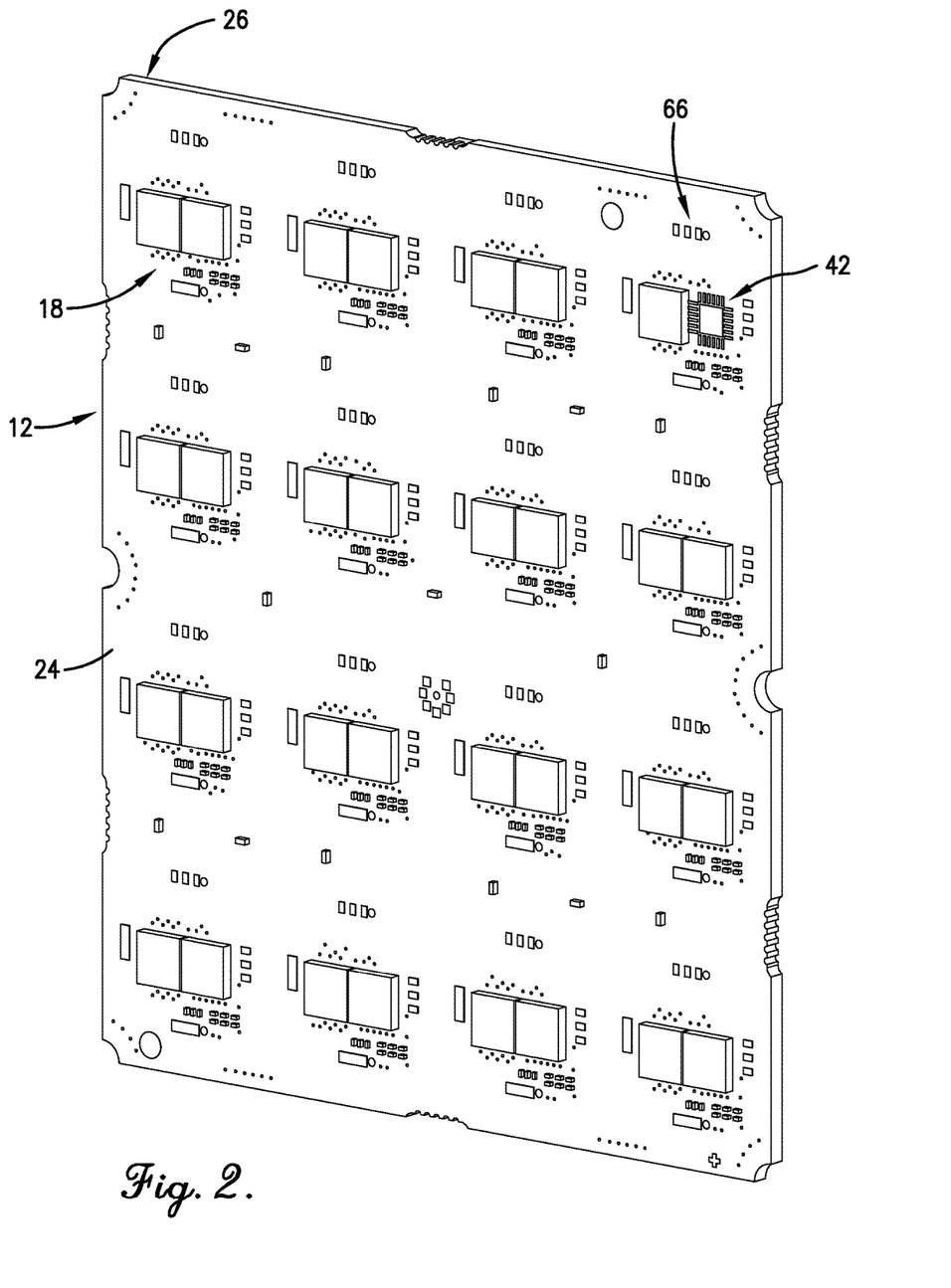
FIG. 2 is a perspective view of the printed circuit board with the antenna elements removed, revealing a plurality of integrated circuit packages that were underneath the antenna elements.
Figure 3:
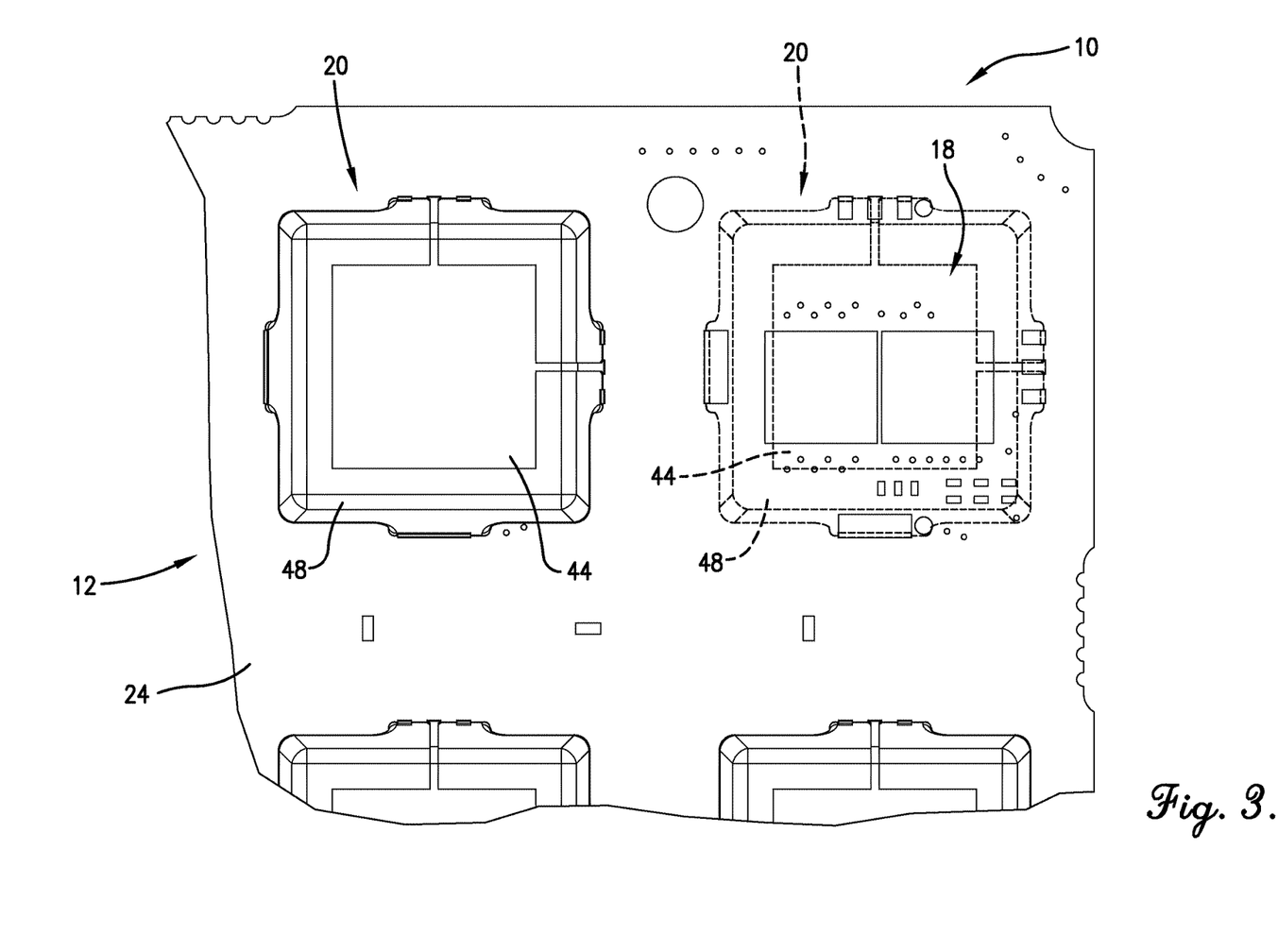
FIG. 3 is a top view of a portion of the printed circuit board with one antenna element shown in hidden lines exposing the integrated circuit packages mounted to the printed circuit board underneath the antenna element.

Each integrated circuit package 18, seen in FIG. 2, generally houses or encapsulates the integrated circuit die, or dies, for one transmitter electronic circuit 14 and one receiver electronic circuit 16. In some embodiments, such as those shown in the figures, two integrated circuit packages 18 are utilized to consolidate the circuit functionality showing in FIG. 6 In other embodiments not shown, one integrated circuit package 18 houses all of the circuitry in FIG. 6. The integrated circuit package 18 may be constructed using known packaging implementations such as through-hole, chip carrier, pin grid array, ball grid array, or the like.

The printed circuit board 12 may include one package outline 42 for each integrated circuit package 18. The package outline 42 may comprise a plurality of conductive pads that correspond to the signal, power, and ground pads of each integrated circuit package 18. Thus, when the antenna array 10 is assembled, each integrated circuit package 18 may be mounted on the first side 24 of the printed circuit board 12 so that the pads of the integrated circuit package 18 are solder bonded to the pads of the package outline 42. FIG. 2 shows the first side 24 of the printed circuit board 12 with all of the integrated circuit packages 18 attached except for one in the upper right corner. In that space, the package outline 42 for one integrated circuit package 18 is visible.

Each antenna element 20, shown in FIGS. 1 and 3-5, generally converts electronic signals into radio waves and vice versa. The antenna element 20 may include one or more directional radiators such as dipole antennas or the like. An exemplary antenna element 20 may be embodied by a micro strip fed patch antenna. The antenna element 20 may include a signal conductor pad 44, a ground conductor pad 46, and a substrate 48. The signal conductor pad 44, best seen in FIGS. 1, 3, and 4, may convert the transmit electronic signal into a radio wave or may convert the radio wave into the receive electronic signal. The signal conductor pad 44 may be formed from one or more layers of metal, such as copper, gold, silver, or the like. The signal conductor pad 44 may be generally planar with at least one dimension determined by, or corresponding to, a frequency, a wavelength, a half wavelength, or a quarter wavelength of the radio wave to be transmitted and received. The antenna array 10 of the present technology may be utilized with, among others, X-band radar systems. An exemplary signal conductor pad 44 may have one dimension, such as a length or a width, approximately equal to 4 millimeters (mm). The signal conductor pad 44 may have a shape determined by, or corresponding to, a polarization of the radio wave to be transmitted and received. An exemplary signal conductor pad 44 may have a quadrilateral, or more specifically square, shape to transmit and receive radio waves with horizontal and vertical polarizations.

In order to transmit and receive radio waves with orthogonal polarizations, such as horizontal and vertical, the antenna element 20 may further include a first signal conductor trace 50 connected to a first side of the signal conductor pad 44 and a second signal conductor trace 52 connected to a second side of the signal conductor pad 44, orthogonal to the first side. The first and second signal conductor traces 50, 52 may be formed from substantially the same metals as the signal conductor pad 44. There may be a third switch 54, substantially similar in construction to the first and second switches 36, 38, which includes a fixed contact connected to the transmit-receive signal path 40 and two switchable contacts that are connected to the first signal conductor trace 50 and the second signal conductor trace 52, respectively. In a first setting, the third switch 54 may connect the transmit-receive signal path 40 to the first signal conductor trace 50. In a second setting, the third switch 54 may connect the transmit-receive signal path 40 to the second signal conductor trace 52.

Figure 5:
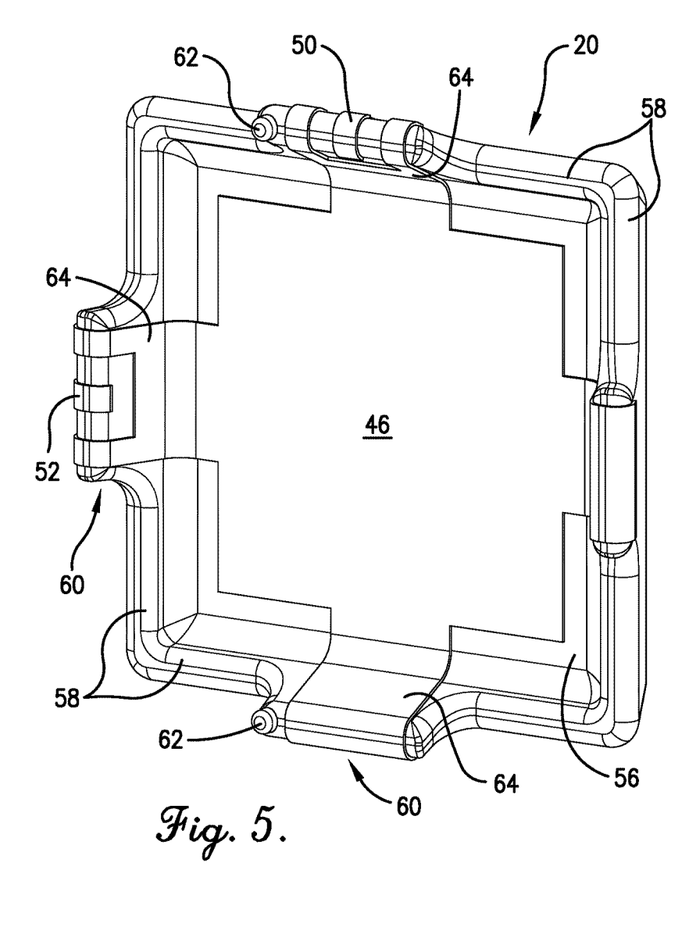
FIG. 5 is a bottom perspective view of one antenna element including a ground conductor pad disposed on the substrate.

The ground conductor pad 46, best seen in FIG. 5, generally provides an electrical ground plane for the signal conductor pad 44 and may have similar features with respect to dimension and shape. In addition, the ground conductor pad 46 may be formed from substantially the same metals as the signal conductor pad 44. Generally, the ground conductor pad 46 is positioned in close proximity to the signal conductor pad. In an exemplary embodiment, the ground conductor pad 46 may be positioned in parallel with the signal conductor pad 44 with a small space therebetween. Typically, the space is filled with a dielectric material such as the substrate 48 discussed below.

Figure 4:
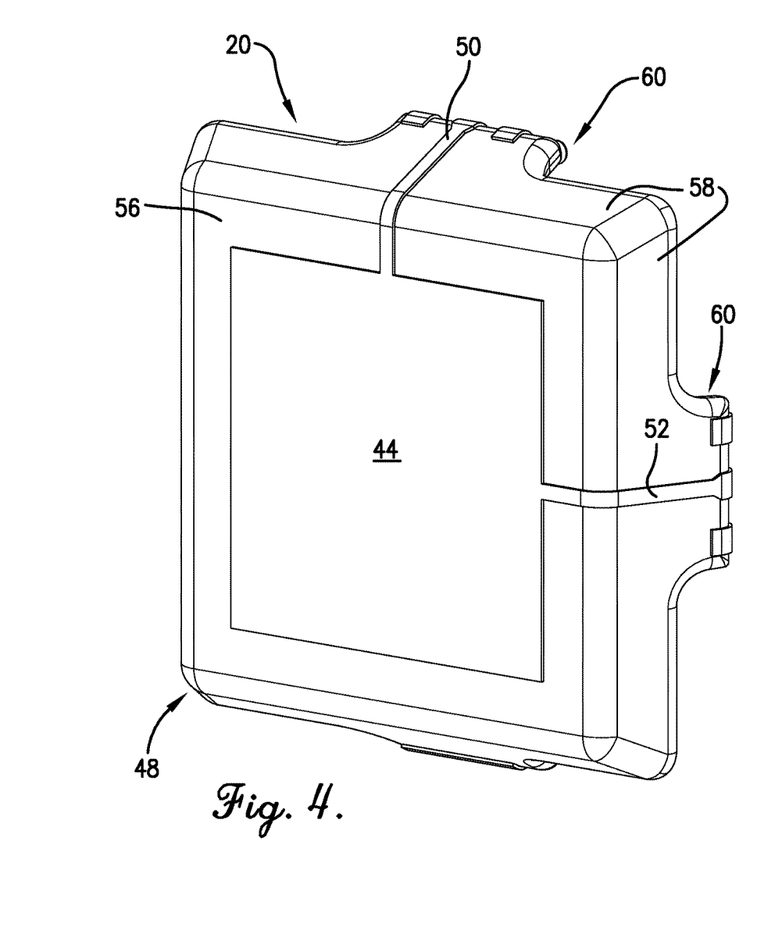
FIG. 4 is a top perspective view of one antenna element including a signal conductor pad disposed on a substrate.

The substrate 48, best seen in FIGS. 4 and 5, generally provides a mechanical structure to support the signal conductor pad 44, the ground conductor pad 46, and the first and second signal conductor traces 50, 52. An exemplary substrate 48 may include a top wall 56 and four side walls 58 connected thereto. The top wall 56 may include an upper surface and an opposing lower surface, while each side wall 58 may include an outer surface and an opposing inner surface. An exemplary top wall 56 may have a generally square shape while each of the four exemplary side walls 58 may have an isosceles trapezoidal shape with a width greater than its height. The side walls 58 may be connected to the top wall 56 and angled outward such that the substrate 48 has the overall shape of a portion of a frusto pyramid—that is, a frusto pyramid without a base wall (i.e., a hollow frustum of a square pyramid). In addition, each side wall 58 includes a tab 60 positioned at the lower edge thereof which attaches the substrate 48 to the printed circuit board 12. Furthermore, a first tab 60 on one side wall 58 and a second tab on an opposing side wall 58 each include an alignment post 62 which is inserted into a corresponding alignment hole on the printed circuit board 12. The alignment posts 62 provide alignment of each antenna element 20 with its associated integrated circuit package 18 on the printed circuit board 12.

The signal conductor pad 44 may be disposed on the upper surface of the top wall 56. The ground conductor pad 46 may be disposed on the lower surface of the top wall 56. The first signal conductor trace 50 may be disposed on the outer surface of a first side wall 58 and its associated tab 60, while the second signal conductor trace 52 may be disposed on the outer surface of a second side wall 58 and its associated tab 60—orthogonal to the first side wall 58. In addition, the antenna element 20 may include ground conductor traces 64 disposed on the inner surface of each side wall 58. The bottom of each tab 60 includes at least one conductive pad for either the first signal conductor trace 50, the second signal conductor trace 52, or the ground conductor traces 64.

The printed circuit board 12 may include a package outline 66 for the antenna element 20 which comprises plurality of conductive pads that correspond to the pads of the first signal conductor trace 50, the second signal conductor trace 52, and the ground conductor traces 64. The package outlines 66 for the antenna elements 20 may be seen in FIGS. 2 and 3.

The substrate 48 may be constructed from rigidized materials that can be formed to have the above-described shape. Materials may include ceramics, polymers, or the like. An exemplary substrate 48 may be formed using a laser direct structuring (LDS) process wherein polymer material that includes a metal-plastic additive may be shaped using known molding techniques. A laser beam, of a given wavelength, is directed to the surface of the shaped polymer to trace a pattern that includes the outlines of the signal conductor pad 44, the ground conductor pad 46, the first and second signal conductor traces 50, 52, and the ground conductor traces 64. The laser beam contacting the polymer activates the metal-plastic additive so that the ability of the surface of the polymer in the laser traced areas to bond with metal is enhanced. Afterward, metal, such as copper, is deposited on the surfaces of the substrate 48 and bonds to the surfaces in the pattern traced by the laser beam. Other layers of metal may be deposited on the base layer of metal in order to develop pads and traces with the proper electrical characteristics.

The antenna array 10 may be formed by generating an imaginary two-dimensional grid that is overlaid on the printed circuit board 12. The points of the grid may have an orthogonal spacing which is determined by, or which corresponds to, a frequency, a wavelength, a half wavelength, or a quarter wavelength of the radio wave to be transmitted and received. An exemplary grid may include points which have an orthogonal spacing of approximately half a wavelength for X-band radar systems. In some configurations, the grid points may be orthogonally spaced approximately between about 0.50 to 0.60 wavelengths apart. Different spacing may be utilized for the X and Y dimensions. For example, the grid point spacing along the X dimension may be approximately about 0.50 wavelength while the spacing along the Y dimension may be approximately about 0.59 wavelengths. Each antenna element 20 may be positioned with its center approximately on one grid point. With the position of each antenna element 20 on the printed circuit board 12 determined, the positions of the package outline 66 for each antenna element 20 on the first side 24 of the printed circuit board 12 may be determined. The pads of the package outline 66 for the antenna element 20 may define a quadrilateral boundary on the first side 24 of the printed circuit board 12. The position within the quadrilateral boundary for the package outline 42 for each integrated circuit package 18 may be determined. The position of the package outline 42 may be determined to accommodate the placement of other components, the routing of conductive traces, the requirement for equivalent signal path lengths, and other considerations. The pads of the package outline 42 for each integrated circuit package 18 may be routed to the appropriate pads of the package outline 66 for its associated antenna element 20.

During assembly of the antenna array 10, the integrated circuit packages 18 may be placed and solder bonded to the package outlines 42 on the first side 24 of the printed circuit board 12, as shown in FIG. 2. Then, the antenna elements 20 may be placed and solder bonded to the package outlines 66. Given the relative positioning of the package outlines for the integrated circuit packages 18 and the antenna elements 20, each antenna element 20 is positioned directly over its associated transmitter and receiver electronic circuits 14, 16 in the integrated circuit package 18.

The antenna array 10 of the present technology provides an optimal solution to keeping the signal path length short between the transmitter and receiver electronic circuits 14, 16 and their associated antenna element 20 by placing the integrated circuit package 18 directly under the antenna element 20 on the first side 24 of the printed circuit board 12. It may be possible to keep the signal path length short between the transmitter and receiver electronic circuits 14, 16 and their associated antenna element 20 by placing the integrated circuit package 18 next to, but not under, the antenna element 20. However, with the size of the antenna element 20 and the spacing between each antenna element 20 in the antenna array 10, there is not enough room in the channels between antenna elements 20 on the first side 24 of the printed circuit board 12 to place the integrated circuit packages 18 and have space to route the conductive signal traces for the transmit and receive electronic signals. The signal path may be shortened by placing the integrated circuit package 18 on side two of the PCB, however this reduces the capability of heat sinking the integrated circuit packages without more elaborate and expensive package designs.

Configurations of the present technology additionally increase Tx/Rx efficiency, reduce power requirements, reduce the required number of connector components, reduce overall physical size, and/or improve heat dissipation. However, depending on configuration, embodiments of the present invention may provide some or none of these benefits.

When the antenna array 10 is implemented with a radar system, the number of antenna elements 20 that are required may be determined by, among other factors, the range of meteorological activities or objects to be detected. Generally, a longer range requires a greater number of antenna elements 20, while a shorter range requires fewer antenna elements 20. Typically, to minimize the design and manufacturing costs for the printed circuit board 12, a single size of printed circuit board 12, such as the exemplary printed circuit board 12 which accommodates a 4×4 antenna array 10, may be produced. The antenna array 10 may be scaled by producing more printed circuit boards 12 (populated with antenna elements 20) and then positioning them adjacent to one another in the nose or wing of an aircraft to meet the requirements of the proper array size. The printed circuit boards 12 may be arranged to produce a square antenna array 10, a rectangular antenna array 10, and/or any other geometric configuration. For instance, the printed circuit boards 12 may be arranged to produce a staggered pattern such as a stair stepped rectangle.

Figure 7:
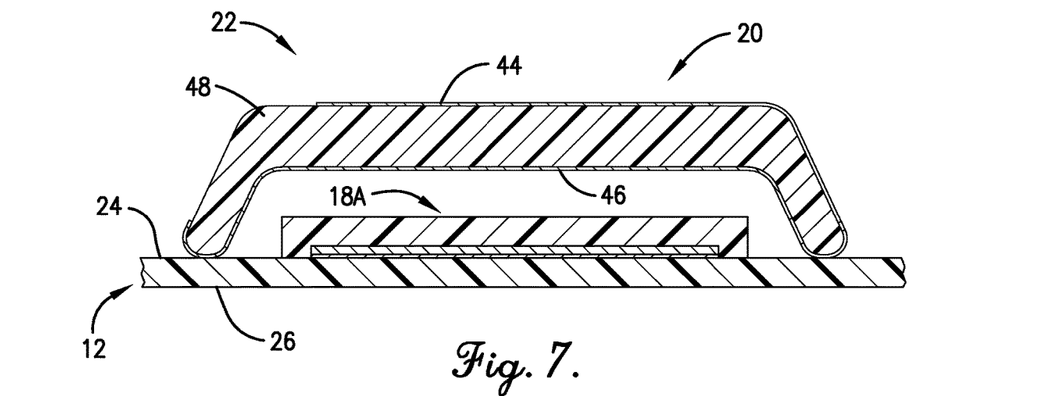
FIG. 7 is a cross sectional view of a transceiver assembly, constructed in accordance with various embodiments of the present technology, including the printed circuit board, one antenna element, and a first embodiment of an integrated circuit package.
Figure 8:
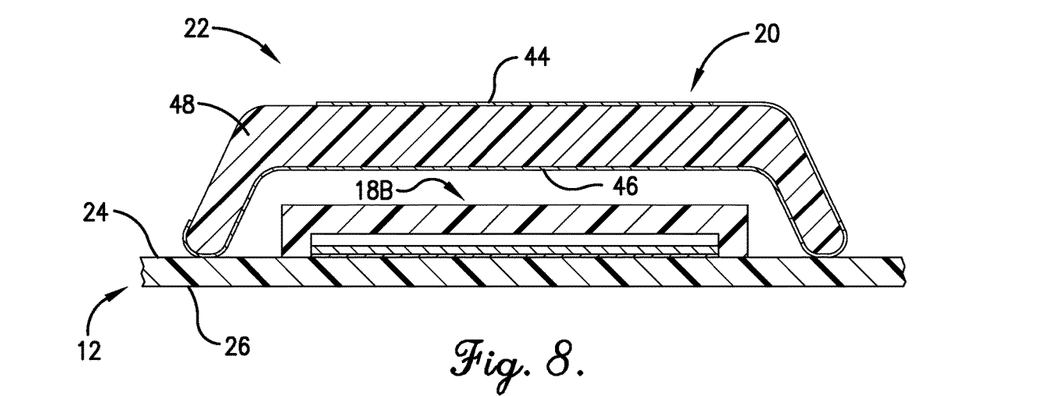
FIG. 8 is a cross sectional view of the transceiver assembly including the printed circuit board, one antenna element, and a second embodiment of the integrated circuit package.
Figure 9:
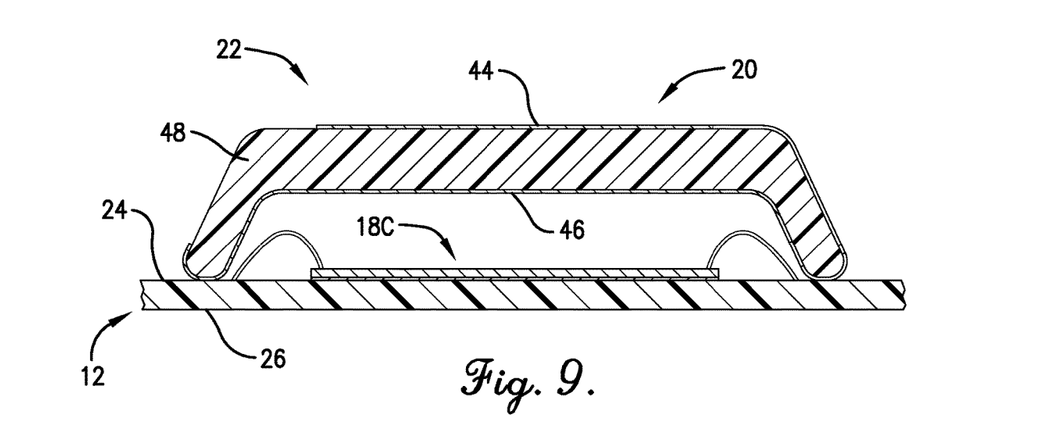
FIG. 9 is a cross sectional view of the transceiver assembly including the printed circuit board, one antenna element, and a third embodiment of the integrated circuit package.

Referring to FIGS. 7-9, cross sectional views of the transceiver assembly 22 with various embodiments of the integrated circuit package 18 are shown. In a first exemplary embodiment, an integrated circuit package 18A may be constructed as a surface mount plastic-molded quad flat pack with no leads (QFN). The integrated circuit package 18A includes a transmitter and receiver circuit (T/R) die mounted on a die attach paddle which serves as a heat transfer medium. The die and the die attach paddle are encapsulated with a plastic mold such that the integrated circuit package 18A includes a top surface, four side surfaces, and a bottom surface. The pads for signals, power, and ground as well as the die attach paddle are positioned on the bottom surface of the integrated circuit package 18A. FIG. 7 shows the integrated circuit package 18A mounted on the first side 24 of the printed circuit board 12 with a small air gap between the integrated circuit package 18A and the antenna element 20.

In a second exemplary embodiment, an integrated circuit package 18B may be constructed as a surface mount air-cavity quad flat pack with no leads, also known as a QFN. The integrated circuit package 18B includes the T/R die mounted on the die attach paddle. In contrast with the plastic-molded QFN, the integrated circuit package 18B includes a lid or cap constructed from plastic or ceramic that is positioned over the die to leave an air gap therebetween. The integrated circuit package 18B also includes the top surface, four side surfaces, and the bottom surface with the pads for signals, power, and ground as well as the die attach paddle positioned on the bottom surface. FIG. 8 shows the integrated circuit package 18B mounted on the first side 24 of the printed circuit board 12 with a small air gap between the integrated circuit package 18B and the antenna element 20.

In a third exemplary embodiment, an integrated circuit package 18C may include a bare T/R die attached directly to a conductive pad for transferring heat and positioned on the first side 24 of the printed circuit board 12. In addition, pads on the bare T/R die for signals, power, and ground may be wire bonded to the pads of the package outline 42 on the first side 24 of the printed circuit board 12. As seen in FIG. 9, the antenna element 20 may provide cover and protection for the bare T/R die of the integrated circuit package 18C.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An antenna array for use with an X-band weather radar system, the antenna array comprising:
   a printed circuit board including a first side and an opposing second side;
   a plurality of integrated circuit packages, each integrated circuit package electrically connected to the first side of the printed circuit board and including at least one of a transmitter electronic circuit and a receiver electronic circuit; and
   a plurality of antenna elements configured to transmit and receive radio waves at frequencies in the X-band, the antenna elements positioned on the printed circuit board in a two-dimensional array, each antenna element positioned above a corresponding integrated circuit package and separated from the integrated circuit package by an air gap;
   wherein a center of each antenna element is located on a point of a grid with grid points orthogonally spaced apart, each antenna element in electronic communication with the at least of the transmitter electronic circuit and the receiver electronic circuit in the corresponding integrated circuit package under the antenna element.

2. The antenna array of claim 1, wherein each antenna element includes a substrate with a top wall and four side walls attached thereto, such that the top wall and the side walls form the shape of a portion of a frusto pyramid over the integrated circuit package.

3. The antenna array of claim 2, wherein each antenna element includes a signal conductor pad disposed on an upper surface of the top wall and a ground conductor pad disposed on a lower surface of the top wall, the air gap separating a top surface and side surfaces of the integrated circuit package from the ground conductor pad disposed on the lower surface of the antenna element's top wall.

4. The antenna array of claim 3, wherein each side wall of each antenna element substrate includes an outer surface and an opposing inner surface and wherein each antenna element includes
   a first signal conductor trace electrically connected to the signal conductor pad, the first signal conductor trace positioned on the outer surface of a first side wall, and
   a second signal conductor trace electrically connected to the signal conductor pad, the second signal conductor trace positioned on the outer surface of a second side wall adjacent to the first side wall.

5. The antenna array of claim 4, wherein the first side wall is orthogonal to the second side wall.

6. The antenna array of claim 2, wherein the four side walls of each antenna element substrate contact the first side of the printed circuit board and define a quadrilateral-shaped boundary thereon and the integrated circuit package positioned under the antenna element is on the first side of the printed circuit board within the quadrilateral-shaped boundary.

7. The antenna array of claim 2, wherein the substrate of each antenna element is formed from polymer material.

8. The antenna array of claim 1, wherein an electronic signal received on the first signal conductor trace is converted to a radio wave with a first polarization and the electronic signal received on the second signal conductor trace is converted to the radio wave with a second polarization orthogonal to the first polarization.

9. The antenna array of claim 1, wherein the transmitter electronic circuit includes a power amplifier and the receiver electronic circuit includes a low noise amplifier.

10. The antenna array of claim 1, wherein the center of each antenna element is located on a point of a grid with grid points orthogonally spaced approximately between about 0.50 to 0.60 radio wave wavelength apart.

11. The antenna array of claim 1, wherein each antenna element includes a top wall and each integrated circuit package includes a top surface, and wherein the air gap separates the top surface of the integrated circuit package and the lower surface of the antenna element's top wall.

12. The antenna array of claim 1, wherein each antenna element includes a square microstrip signal conductor pad in communication with the transmitter electronic circuit and the receiver electronic circuit.

13. The antenna array of claim 12, wherein the square microstrip signal conductor pad transmits and receives radio waves with orthogonal polarizations.

14. The antenna array of claim 1, wherein each integrated circuit package includes an air gap between a top surface and a bottom surface of the integrated circuit package.

15. An antenna array for use with an X-band weather radar system, the antenna array comprising:
   a printed circuit board including a first side and an opposing second side;
   a plurality of integrated circuit packages, each integrated circuit package electrically connected to the first side of the printed circuit board and including at least one of a transmitter electronic circuit and a receiver electronic circuit; and
   a plurality of antenna elements configured to transmit and receive radio waves at frequencies in the X-band, the antenna elements positioned on the printed circuit board in a two-dimensional array, each antenna element positioned above a corresponding integrated circuit package and separated from the integrated circuit package by an air gap,
   wherein a center of each antenna element is located on a point of a grid with grid points orthogonally spaced approximately between about 0.50 to 0.60 radio wave wavelength apart, each antenna element in electronic communication with the at least of the transmitter electronic circuit and the receiver electronic circuit in the corresponding integrated circuit package under the antenna element, and
   wherein each antenna element includes—
      a substrate with a top wall and four side walls attached thereto, such that the top wall and the side walls form the shape of a portion of a frusto pyramid over the integrated circuit package,
      a signal conductor pad disposed on an upper surface of the top wall,
      a ground conductor pad disposed on a lower surface of the top wall,
      a first signal conductor trace electrically connected to the signal conductor pad, the first signal conductor trace positioned on an outer surface of a first side wall, and
      a second signal conductor trace electrically connected to the signal conductor pad, the second signal conductor trace positioned on an outer surface of a second side wall adjacent to the first side wall.

16. The antenna array of claim 15, wherein an electronic signal received on the first signal conductor trace is converted to a radio wave with a first polarization and the electronic signal received on the second signal conductor trace is converted to the radio wave with a second polarization orthogonal to the first polarization.

17. The antenna array of claim 15, wherein the center of each antenna element is located on a point of a grid with grid points orthogonally spaced approximately between about 0.50 to 0.60 radio wave wavelength apart.

* * * * *